(12) United States Patent
Pinotti et al.

(10) Patent No.: US 6,200,241 B1
(45) Date of Patent: Mar. 13, 2001

(54) DIFFERENTIAL AND DRIVE PINION ASSEMBLY

(75) Inventors: Carlos E. Pinotti, São Paulo (BR); I-Chao Chung, Troy, MI (US)

(73) Assignee: Meritor Do Brasil, S.A., Limeira - SP (BR)

( * ) Notice: Subject to any disclaimer, the term of this patent is extended or adjusted under 35 U.S.C. 154(b) by 0 days.

(21) Appl. No.: 09/446,847

(22) PCT Filed: Jul. 29, 1997

(86) PCT No.: PCT/BR97/00038

§ 371 Date: Mar. 20, 2000

§ 102(e) Date: Mar. 20, 2000

(87) PCT Pub. No.: WO99/06742

PCT Pub. Date: Feb. 11, 1999

(51) Int. Cl.[7] ............................. F16H 57/02; F16H 48/08
(52) U.S. Cl. ............................................................ 475/230
(58) Field of Search .............................. 74/425; 475/230

(56) References Cited

U.S. PATENT DOCUMENTS

| 1,106,149 | * | 8/1914 | Loomis | 475/230 |
| 1,241,893 | * | 10/1917 | Alden | 74/425 |

FOREIGN PATENT DOCUMENTS

| 58-207544 | * | 12/1983 | (JP) | 74/425 |

* cited by examiner

Primary Examiner—Dirk Wright
(74) Attorney, Agent, or Firm—Carlson, Gaskey & Olds

(57) ABSTRACT

An improved mount for a drive pinion to drive a gear differential includes a tapered bearing (54, 58) mounted at both inner and outer ends of the drive pinion (24). The tapered bearing (54) at the inner shaft portion (55) supports the drive pinion in a housing (50) which abuts an outer race of a bearing (48) which supports one of the side gears (46). The use of the tapered bearing (54) at the inner end of the drive pinion provides smaller packaging requirements for the overall assembly, and provides a more secure mount for the inner end of the drive pinion.

6 Claims, 2 Drawing Sheets

DIFFERENTIAL AND DRIVE PINION ASSEMBLY

BACKGROUND OF THE INVENTION

This application relates to an improved mount for the drive pinion utilized to drive a differential, wherein an inner end of the drive pinion is supported in a tapered roller radial bearing.

Differentials are utilized in the drive lines of many modem vehicles. Typically, a differential takes a rotating input and drives two shafts which extend in opposed directions. An outer gear is attached to a differential case, and engages a drive pinion. A drive input is applied through the drive pinion to drive the differential case. The differential case drives two side gears which are fixed to the two shafts.

Drive pinions transmit high torque, and must be adequately supported for proper operation of the overall pinion and differential. In the prior art, the drive pinions have typically been supported by one of two methods. In a first method, two tapered roller bearings are placed on an outer drive pinion shaft outwardly of the drive pinion teeth. The two tapered roller bearings typically face in opposed directions, and together provide a mount for the drive pinion which resists movement. Tapered roller bearings typically have inner and outer races each abutting one of a housing and a rotating member, and prevent movement between the housing and rotating tapered bearing surfaces.

In a second method of mounting the drive pinion, in addition to the two outer tapered bearings, a cylindrical bearing is utilized at the inner end of the drive pinion inwardly of the drive pinion teeth. In the first arrangement, the drive pinion is not supported at its inner end as securely as would be desired. Moreover, the use of two tapered bearings at the outer end requires more space than is desirable. In addition, in the second embodiment, one additional being is required to support the drive pinion.

SUMMARY OF THE INVENTION

In the disclosed embodiment of this invention, a drive pinion is associated with a differential. The drive pinion is supported at its outer end in a tapered roller bearing. A second tapered roller bearing is positioned on the inner shaft of the drive pinion. The inner bearing has an inner race which abuts an enlarged neck on the drive pinion shaft. An outer race of the bearing is supported in a housing which surrounds the drive pinion.

Preferably, the housing which receives the outer race of the inner tapered bearing is secured directly radially outwardly of a bearing which supports one of the ends of the differential case. Thus, the necessary package size inwardly of the drive pinion is not increased even though the inner tapered roller bearing is used.

Moreover, since only a single tapered bearing is necessary outwardly of the drive pinion teeth, less space is required outwardly of the teeth than is required in the prior art. The use of the tapered bearing at the inner end provides a more secure mount for the pinion gear.

The above and other features and benefits of the present invention can be best understood from the following specification and drawing, of which the following is a brief description.

DETAILED DESCRIPTION OF A PREFERRED EMBODIMENT

Figure 1:
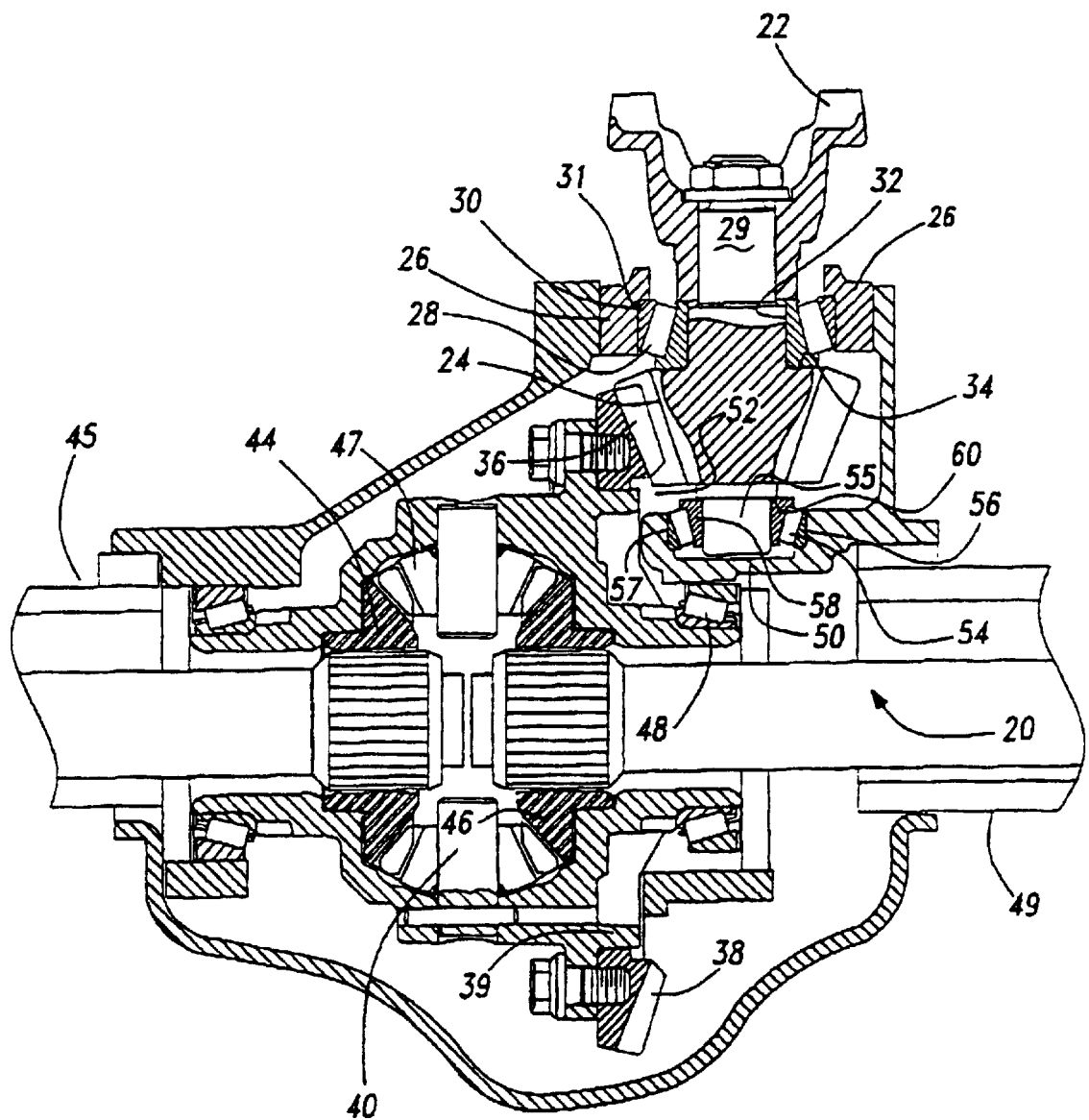
FIG. 1 shows an inventive differential.
Figure 2:
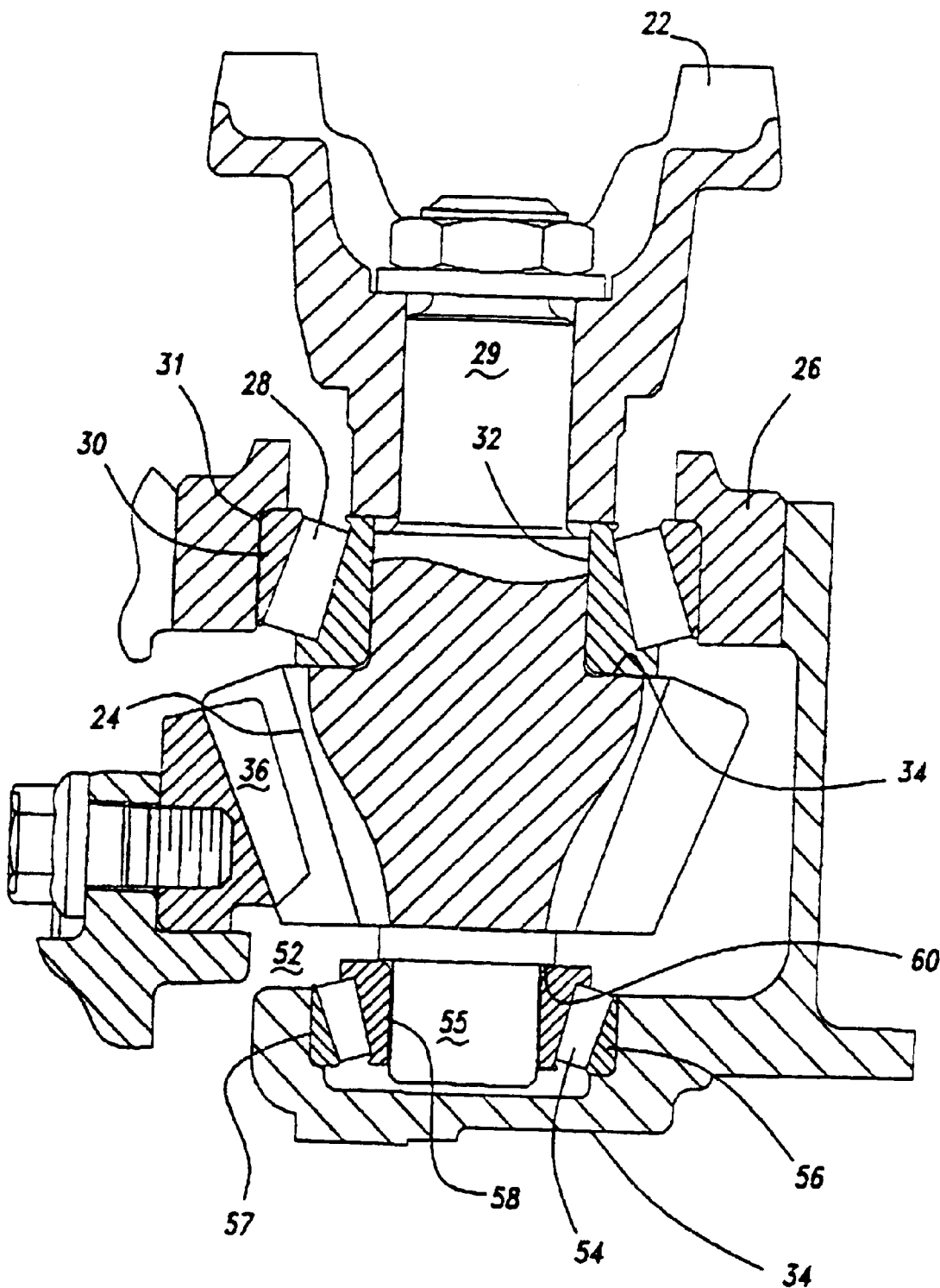
FIG. 2 is a detail of the inner bearing mounting the inner pinion shaft.

FIG. 1 and 2 show a differential drive apparatus 20 incorporating a yoke 22 for driving a drive pinion 24. Drive pinion 24 is received within a first outer housing 26 which is fixed against rotation in a housing 50. A tapered bearing 28 mounts an outer pinion shaft 29 within housing 26. As shown, tapered bearing 28 includes an outer race 30 which abuts a neck 31 in housing 26. An inner race 32 abuts a face 34 of the gear 24. Preferably, face 34 is formed directly axially outwardly of the drive pinion teeth 36.

Gear teeth 36 engage a drive gear 38 which drives a differential case 39, as known. The structure of the differential is as known in the art. Essentially, a spider shaft 40 rotates side gears 44 and 46 through differential pinion gears 47. In one type of differential, axle housings 45 and 49 mount axle halves extending from housing 50, again as is known. Other differential types benefit from this invention. A bearing 48 supports the one side of the differential case 39 adjacent to the drive pinion 24.

A housing 50 is fixed outwardly the outer race of bearing 48. Housing 50 includes a support portion 52, with housing portions 50 and 52 supporting a tapered bearing 54 at the inner shaft portion 55 of the drive pinion 24. The bearing 54 includes an outer race 56 abutting a face 57 of the housing 50. Further, an inner race 58 abuts a ledge 60 on inner shaft end 55. The combination of the tapered bearings 54 and 28 provides a secure mount for the drive pinion 24 within the differential and drive pinion assembly 20. The use of the tapered roller bearing at the inner end of the drive pinion 24 ensures the inner end, and the gear teeth 36 are properly and securely mounted. Further, the elimination of the second previously utilized tapered bearing at the outer end allows the package size of the outer end to be reduced compared to the prior art.

Notably, the radially outermost end of the spider 40 is radially (measured from the axis of the side shafts) beyond the extent of tapered bearing 54. That is, the invention positions the bearing 54 such that it does not require any additional radial space. Thus, since the invention reduces necessary radial space at the outer shaft, it reduces the envelope of the entire assembly. A preferred embodiment of this invention has been disclosed, however, a worker of ordinary skill in the art would recognize that certain modifications would come within the scope of this invention. For that reason, the following claims should be studied to determine the true scope and content of this invention.

What is claimed is:

1. A differential and drive pinion assembly comprising: a differential including a differential case having a drive gear fixed to an outer periphery, said differential case including two side gears and a spider gear for driving said side gears received within said differential case; a fixed housing surrounding said differential case; a drive pinion having gear teeth engaging said drive gear of said differential case, said drive pinion including inner and outer shaft portions extending from said drive pinion teeth away from said differential case, tapered bearings mounted on each of said inner and outer drive pinion shaft portions to support said drive pinion within said fixed housing; and said differential case includes a pair of opposed side gears driving opposed axle shafts to define an axis, and said differential case driving a spider shaft, differential pinion gears engaging said side gears to rotate said side gears, said spider shaft defining an axis which is parallel but offset to the axis defined by said drive pinion, and said spider shaft extending radially outwardly such that an outer end extends from an axis defined by the side gears for a greater distance than said tapered bearing mounted on said inner drive pinion shaft portion.

2. An assembly as recited in claim 1, wherein said inner shaft portion has an outwardly extending neck, said outwardly extending neck abutting one of an inner and outer race of a tapered bearing received on said inner shaft portion, the other of said inner and outer races abutting an end face of a housing which surrounds said inner tapered bearing.

3. An assembly as recited in claim 2, wherein said outwardly extending neck on said inner shaft portion abuts said inner race to provide a thrust bearing surf ace.

4. An assembly as recited in claim 3, wherein said tapered bearing on said outer shaft portion includes an inner race which abuts a face of said drive pinion.

5. An assembly as recited in claim 1, wherein said differential case includes a pair of opposed side gears driving opposed axle shafts, said differential case including portions surrounding said axle shafts, and a third bearing Supporting one side of said differential case associated with said drive pinion, said fixed housing which mounts said tapered bearing for supporting said inner shaft portion being positioned at an outer face of said third bearing which supports said side shaft.

6. An assembly as recited in claim 1, wherein said inner and outer tapered bearings are roller bearings.

* * * * *